Jan. 30, 1951  J. V. WALLER  2,539,498
METHOD OF PREPARING CINEMA FILM TO DEPICT
REPETITIVE VARIATION OF SUBJECT
Filed Sept. 18, 1947  2 Sheets-Sheet 1
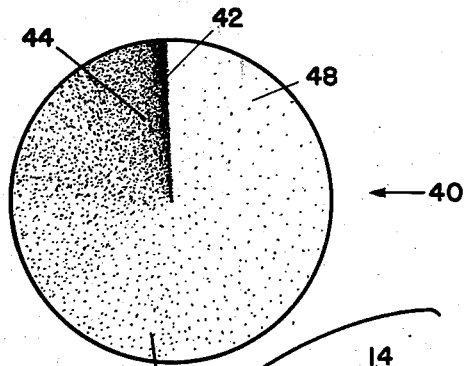
FIG. 2
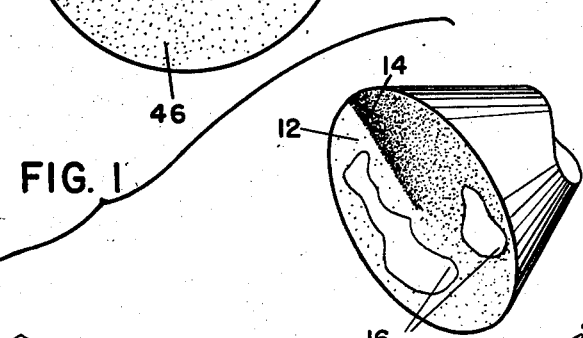
FIG. 1
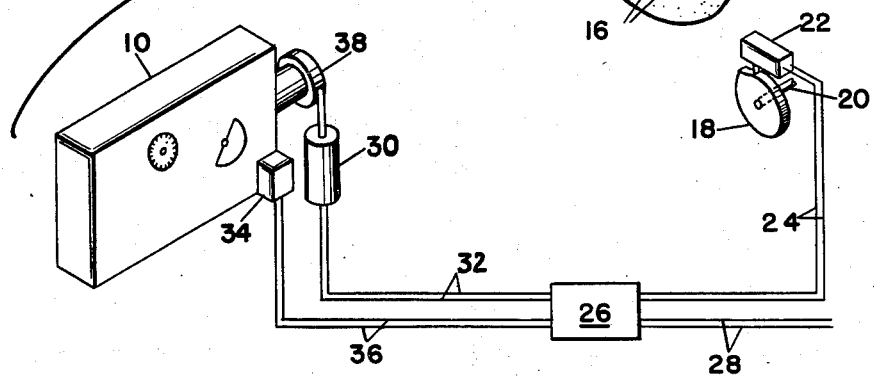
INVENTOR.
JOHN V. WALLER
BY
ATTORNEY Jan. 30, 1951   J. V. WALLER   2,539,498
METHOD OF PREPARING CINEMA FILM TO DEPICT
REPETITIVE VARIATION OF SUBJECT
Filed Sept. 18, 1947   2 Sheets-Sheet 2

INVENTOR.
JOHN V. WALLER
BY
ATTORNEY

UNITED STATES PATENT OFFICE 2,539,498

METHOD OF PREPARING CINEMA FILM TO DEPICT REPETITIVE VARIATION OF SUBJECT

John V. Waller, Arlington, Va.

Application September 18, 1947, Serial No. 774,730

16 Claims. (Cl. 88—16)

(Granted under the act of March 3, 1883, as amended April 30, 1928; 370 O. G. 757)

This invention relates to cinema films, and particularly to a method of producing a cinema training film that simulates the changing appearance of a radar viewing screen, or the like, in operation.

An object of the invention is to utilize cinematographic apparatus that is easy and inexpensive to provide.

Another object is to reproduce the appearance of an object having low light intensity and a substantially cyclically changing appearance.

Another object is to simulate the appearance of an oscilloscope trace comprising a radial sweep that advances circumferentially of a circular field.

Figure 3:
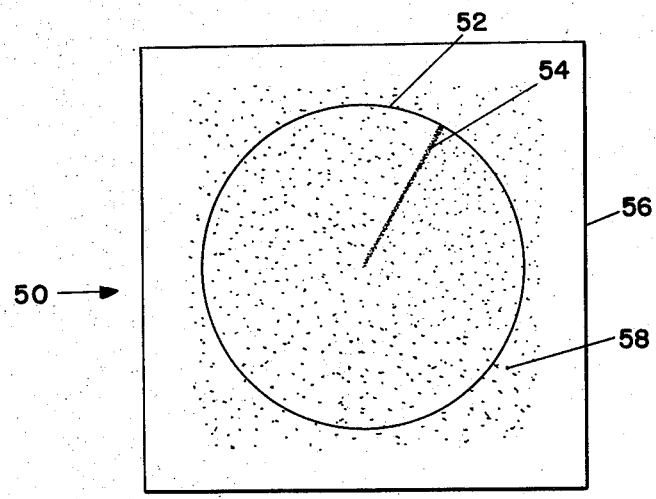
Figure 4:
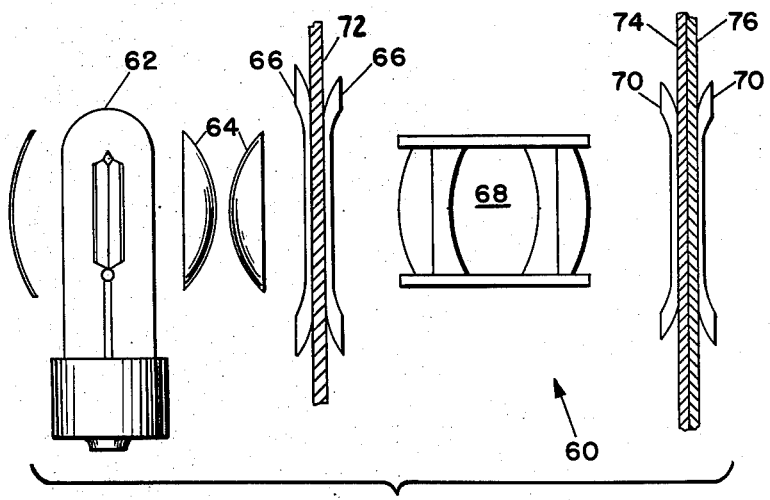

Further objects and advantages of this invention will be apparent from the following description and claims in connection with the accompanying drawing, in which Fig. 1 illustrates a camera, shutter, and oscilloscope arrangement adapted to aid in carrying out the method of the invention, Fig. 2 shows a polar "gray scale" employed in another step of the process herein set forth, Fig. 3 illustrates a means of reproducing the scintillation of the radial sweep that appears on the oscilloscope of radar apparatus, and Fig. 4 shows an arrangement of optical equipment for combining images on one film.

In training personnel to view with understanding the graphic representations that appear on an oscilloscope in use, it is highly desirable to employ cinematographic methods because this medium affords an opportunity to present in visible form and with accompanying audible instructions and comments the phenomena sought to be taught. Projection of motion pictures makes possible the simultaneous instruction of large numbers of pupils and also minimizes the demand for technical personnel in conveying the necessary information, since this can be recorded once and then reproduced at will and in the same manner as originally presented by experts.

Unfortunately, however, the low level of illumination of oscilloscopes currently in use presents major difficulties in attempting to photograph the constantly-changing aspect of the screen. This difficulty is easily surmountable where the phenomena are strictly cyclic in character, since in that case a frame of film may be exposed repetitively to successive occurrences of the same representation, but where some of the factors concerned do not repeat themselves in exacly the same way the problem is very much more difficult. Conventional cinematographic "animation" techniques are not particularly practicable since they would require the collaboration of persons well versed in the use of radar or analogous equipment with artisans skilled in the techniques of animation, and in any event there probably would be objectionable artificiality in the end result even if the most exhaustive data were recorded by competent personnel during actual employment of the equipment to be represented. Further difficulty arises from the inability of films to record the fine gradations of tone appearing on the oscilloscope screen.

The method described herein, on the other hand, employs basically an actual oscilloscope representation, and by means of a novel technique restores the changing appearance concomitant to the passage of the radial sweep and to the progressively diminishing intensity of the image on the oscilloscope, which it is not practicable to record originally. The resulting film depicts in very realistic fashion what was shown originally on the oscilloscope. The manner in which this is accomplished will be set forth in the following description as supplemented by the annexed drawing, wherein 10 is a motion-picture camera and 12 is an oscilloscope screen. 14 is the glowing radial sweep that advances clockwise as viewed in the drawing, rotating about the center of screen 12 as an axis. In the wake of radius 14 (i. e., the area immediately counterclockwise of, or behind, the radius) the screen glows relatively brightly because the excitation attributable to the electron beam that produces the glow of radius 14 renders the material of the screen temporarily phosphorescent. The glow diminishes, or "decays," with time, and the screen brilliance just in advance of radius 14 (glow that remains from the preceding passage of the radius through that area) is but a fraction of that in the wake of the radius. Areas 16 represent regions where a portion of radius 14 was made to have a different intensity by the operation of circuits within the radar equipment that are not concerned in this invention, but these areas constitute the essential information on screen 12 that it is desired to reproduce. Areas 16 may represent, for example, the configuration of nearby islands or mainland, vessels, etc., and the location of such islands, etc., relative to the vessel in which the radar equipment is installed is measured by the distance and direction of such areas from the center of screen 12 on a predetermined scale. In effect, the view depicted on the screen is a map of the surrounding area, with the radar-carrying vessel at the center. When the vessel is in motion, the map is theoretically correct (at any instant) only for the area being swept out at that instant by radius 14, all other regions being the residual phosphorescence corresponding to respective former instants when the radius passed through those regions. For example, the sector immediately ahead of radius 14 shows the view of the surroundings relative to a center corresponding to the position that the vessel occupied almost one cycle earlier of the radial sweep, i. e., nearly the length of time that is required for radius 14 to complete a circuit of screen 12. For this reason, successive traces do not register at the same point, but the representation on screen 12 drifts across the screen in a direction contrary to the motion of the vessel and at a speed that is proportional to the vessel's speed and to the scale of the "map." For example, if radius 14 is five inches long and represents a fifteen mile actual distance, and if it traces a complete circuit of screen 12 in five seconds, then with the vessel traveling at twenty knots the view depicted on screen 12 will move about one one-hundredth inch per revolution of radius 14. This is a small amount to be sure, but it is sufficient to defeat efforts to photograph the scene by repeatedly exposing the same frame of film at corresponding points of consecutive "cycles." Also, as stated previously, the brilliance of the screen is inadequate to register satisfactorily with but a single exposure. Therefore, cam 18 is provided in the radar equipment and is driven by shaft 20 that rotates synchronously with radius 14, both the shaft and the radius being synchronized with the rotation of the radar antenna, and cam 18 is adapted to actuate microswitch 22 at precisely the same point in every cycle. Switch 22 is connected by leads 24 to controller 26 that is provided with electrical power via leads 28 from a source not shown. Controller 26 energizes electromagnet 30 via leads 32 during alternate cycles, and energizes tripping device 34 via leads 36 during the intervening cycles. That is to say, electromagnet 30 is energized for the period of one rotation of cam 18 (or of radius 14), and tripping device 34 is energized during the period of the next rotation of cam 18, and then the procedure is repeated. Electromagnet 30, when energized, opens shutter 38 and permits film in camera 10 to be exposed to the scene on screen 12 for a complete cycle of rotation of radius 14, whereby all the phosphorescent glow emitted from the screen for a complete cycle is effective to register on one frame of the film, and the accumulation of light energy is sufficient to define an adequately exposed image on that frame of film. During the succeeding cycle when shutter 38 is closed, tripping device 34 permits the film transport in camera 10 to advance the film to the next frame. It is possible with the aid of slightly more complex control equipment that can be provided by a skilled mechanic or electrician to reduce the interval (during which film is transported) to a very small fraction of a cycle, but in any event the shutter should be open for a complete cycle so that illumination of the entire area of screen 12 will be faithfully represented. If an exposure of less than a complete cycle is allowed, a portion of the screen surface will not have had the benefit of light arising from the presence of radius 14 in that area, and there will therefore be a sector relatively less exposed than the rest of the scene. Hence the end product of the process will be imperfect to the extent that a steady dark sector will be seen superimposed on an otherwise accurate representation. Conversely, an exposure of slightly more than a cycle results in a film with an extraneous light sector.

The foregoing procedure yields a film in which each frame shows the "integrated" view of the screen for a complete cycle, i. e., the level of illumination throughout the screen is equalized (except for areas 16, which are at a different level) because radius 14 has made a complete circuit of screen 12 during the time the film was exposed. Successive frames of film represent alternate cycles if the simple control illustrated is utilized, or in any event each frame preferably represents a complete cycle or an integral number of complete cycles, and a short time interval separates consecutive frames.

To restore the visual effect of the sweeping radius to such "integrated" views, the devices of Figs. 2 and 3 are employed. Fig. 2 shows a "gray scale" 40 arranged in polar fashion so that radius 42 defines the border between area 44 of maximum density and area 48 of minimum density, the intervening area 46 being of smoothly-varying density to unite area 44 with area 48 through substantially imperceptible gradations. Scale 40 is photographed on a separate length of film under conditions arranged to produce an image, on this film, of exactly the correct size and location to register with the images of screen 12 on the film previously described. Successive frames of the film showing gray scale 40 are exposed with the gray scale occupying a series of uniformly spaced angular positions, the spacing between the positions being gauged so that a complete revolution is described when sufficient frames of film have been exposed to correspond to the length of a cycle of radial sweep 14 at the projection speed to be used for the final film. In other words, if the film produced by photographing gray scale 40 were projected at standard projection speed, the scale would appear to rotate at the same speed as does radius 14 on the equipment being portrayed.

"Cell" 50 of Fig. 3 comprises a white disc 52 carrying a black radial line 54, and a transparent sheet 56 arranged in front of disc 52 and provided with a large number of small, white (but opaque) dots 58, for example by flecking or spattering white paint thereon. This arrangement is photographed with disc 52 occupying successive, uniformly spaced angular positions in respective frames of film, as was described before in the case of gray scale 40. The dimensions and location of the image created on this third film are likewise controlled to register with the image of screen 12 on the original film. It has been found that a negative motion picture of such a "cell" advancing through its successive positions closely simulates the scintillating appearance of oscilloscope radius 14, which it is desired to portray.

In Fig. 4 are shown components of an "optical printer" 60, comprising light source 62, condensing system 64, projection film guides 66, projection lens assembly 68, camera film guides 70, and films 72, 74, and 76. The latter two films are arranged as a "bi-pack" for contact printing whereby subject matter depicted on film 74 can be transferred to film 76. Film 72 can be used to modulate the light source so as to vary the illumination of chosen areas of film 74 in any desired manner.

In operation, a first film is exposed in camera 10 to record "integrated" cycles of the sweep of radius 14 around screen 12. Each frame represents a complete revolution of the radius, and intervals of non-exposure occur between frames to permit the film to be advanced, as aforesaid. It should be noted here that if shutter 38 is adapted to operate on "Time" (i. e., one impulse opens shutter and a second impulse closes it), electromagnet 30 can be energized directly by microswitch 22 without the intervention of programming controller 26. Tripping device 34 can be omitted also since the camera may be actuated manually to advance the film during the periods when shutter 38 is closed. The film produced in this step constitutes a negative of the aspect of screen 12 as "integrated" over a complete rotation of radius 14, and since the radius has appeared equally in all portions of screen 12 (except for areas 16) during that time it no longer is discernible as an entity on the film.

The first film is preferably reproduced to a positive "still" print, and from this positive an "extended" negative is made, i. e., each frame of the positive is printed onto another negative film for a sufficient number of frames to provide the desired projection time, which normally would be the length of time that elapsed (in originally filming screen 12) between the start of one exposure of camera 10 and the start of the next exposure. To obviate abrupt and unrealistic changes in the scene finally produced, it is desirable at this time to "control" exposure and development and also to effect "lap dissolves" from each series of frames (a series corresponding to one frame of the positive "still" film) to the succeeding series. When properly done, this technique yields a negative that corresponds in projection time to the elapsed time that was required to record the original oscilloscope indications; the individual frames depict the "integrated" or what might be called the "average" view of the screen during the corresponding cycle, areas 16 being shown at one level of intensity and the remainder of the surface of screen 12 being shown at another level of intensity, without any appearance of radius 14; and successive cycles merge imperceptibly into one another. This negative is then contact-printed to make a positive. This is the "basic scene positive." Optionally, the basic scene positive can be made directly from the original negative, without the intervening steps of making a positive "still" print and reproducing the positive still print as an "extended negative." However, it is rather difficult to control all the variables in one composite operation, and comparable results are not usually to be expected when the process is thus abbreviated.

Another negative film is prepared by photographing gray scale 40 in successive angular positions to simulate the progress of the relatively light and relatively dark areas originally present on screen 12 as a consequence of the rotation of radius 14 and of the phosphorescence that ensued. As aforesaid, the successive angular positions of gray scale 40 are selected so that in projection it will appear to rotate at the same speed as did radius 14 originally. The resulting film is technically a negative, in that the tonal scale on the film is reversed from that of the subject photographed, but the gray scale was prepared so that this "negative" has a range of tonal values corresponding in direction of progression to that of the oscilloscope screen at a selected instant. The film so produced is referred to as a "traveling matte." Similarly, a negative film of "cell" 50 is prepared to show radius 54 occupying successive angular positions as previously described for gray scale 40. Care is exercised that the movements of radius 54 and gray scale radius 42 are synchronized frame by frame so that they can presently be combined. This is most reliably done by utilizing the "stop motion" principle, whereby each of the objects to be photographed is carefully oriented in a selected angular position for each frame exposed. The film of radius 54 may be referred to as a "moving element film."

The three components are now synthesized into a final negative as follows: The "basic scene positive" is threaded into optical printer 60 as at 74, and an unexposed negative is arranged as at 76 for contact printing from the positive. The "traveling matte" is installed for projection as at 72, and the printer is set into operation. Light from light source 62 is collected by condensing lens system 64 and illuminates film 72, the images on which are projected frame-by-frame through projector lens 68 onto the bi-pack comprising films 74 and 76. Obviously all three films must be advanced synchronously so that the final negative will carry the image of "traveling matte" at 72 superimposed on "basic scene positive" at 74. The traveling matte and the basic scene positive are next removed from the apparatus, and the final negative, with the images still latent (undeveloped), is bi-packed with the "moving element film," care being taken that the corresponding frames are in register; that is, that the position of radius 54 on the "moving element film" agrees with the latent image of radius 42 on the negative. A modulating film in the projector (as at 72) is unnecessary in this step, but if desired the "basic scene positive" can be placed in the projector and synchronized with the bi-pack 74, 76 so that the ultimate trace of radius 54 will be modulated in intensity to correspond to presence or absence of areas 16 in the scene. After this exposure, the final negative is developed out and may be utilized for the production of positives in the conventional manner. The films thus produced simulate the original appearance of the oscilloscope screen in remarkable fashion, notwithstanding that direct recording of the changing appearance of the oscilloscope is impracticable because available films are unable to register the wide variation in tones on the screen at the low level of illumination afforded.

Modifications and changes may be made in this invention without departing from the spirit and scope thereof as set forth in appended claims.

The invention described herein may be manufactured and used by or for the Government of the United States of America for governmental purposes without the payment of any royalties thereon or therefor.

I claim:

1. In the production of a cinema film depicting the changing appearance of a subject, the steps of preparing a scene film by exposing a frame for a cycle during which the appearance of the subject varies, reproducing and extending the scene film to a sufficient number of frames to afford a desired length of projection time, and combining the said number of frames with a traveling matte to simulate the original changing appearance of the subject.

2. In the production of a cinema film depicting the cyclically changing appearance of a subject, the steps of preparing a scene film by exposing a frame for an integral number of complete cycles of variation of the subject, reproducing and extending the scene film to a sufficient number of frames to afford a desired length of projection time, and combining the said number of frames with a traveling matte to simulate the original changing appearance of the subject.

3. In the production of a cinema film depicting the substantially cyclically changing appearance of a subject, the steps of preparing a scene film by exposing a frame for an integral number of complete virtual cycles of variation of the subject, reproducing and extending the scene film to a sufficient number of frames to afford a desired length of projection time, and combining the said number of frames with a traveling matte to simulate the original changing appearance of the subject.

4. In the production of a cinema film depicting the changing appearance of a subject, the steps of preparing a scene film by exposing each frame for a cycle during which the appearance of the subject varies, reproducing and extending the scene film to a sufficient number of frames to afford a desired length of projection time, lap-dissolving between consecutive scenes on the reproduced and extended scene film, and combining the said number of frames with a traveling matte to simulate the original changing appearance of the subject.

5. In the production of a cinema film depicting the substantially cyclically changing appearance of a subject, the steps of preparing a scene film by exposing each frame for an integral number of complete virtual cycles of variation of the subject, reproducing and extending the scene film to a sufficient number of frames to afford a desired length of projection time, lap-dissolving between consecutive scenes on the reproduced and extended scene film, and combining the said number of frames with a traveling matte to simulate the original changing appearance of the subject.

6. In the production of a cinema film depicting the changing appearance of a subject, the steps of preparing a scene film by exposing a frame for a cycle during which the appearance of the subject varies, reproducing and extending the scene film to a sufficient number of frames to afford a desired length of projection time, and combining the said number of frames with a traveling matte and with a moving element film to simulate the original changing appearance of the subject.

7. In the production of a cinema film depicting the cyclically changing appearance of a subject, the steps of preparing a scene film by exposing a frame for an integral number of complete cycles of variation of the subject, reproducing and extending the scene film to a sufficient number of frames to afford a desired length of projection time, and combining the said number of frames with a traveling matte and with a moving element film to simulate the original changing appearance of the subject.

8. In the production of a cinema film depicting the substantially cyclically changing appearance of a subject, the steps of preparing a scene film by exposing a frame for an integral number of complete virtual cycles of variation of the subject, reproducing and extending the scene film to a sufficient number of frames to afford a desired length of projection time, and combining the said number of frames with a traveling matte and with a moving element film to simulate the original changing appearance of the subject.

9. In the production of a cinema film depicting the changing appearance of a subject, the steps of preparing a scene film by exposing each frame for a cycle during which the appearance of the subject varies, reproducing and extending the scene film to a sufficient number of frames to afford a desired length of projection time, lap-dissolving between consecutive cycles on the reproduced and extended scene film, and combining the said number of frames with a traveling matte and with a moving element film to simulate the original changing appearance of the subject.

10. In the production of a cinema film depicting the substantially cyclically changing appearance of a subject, the steps of preparing a scene film by exposing each frame for an integral number of complete virtual cycles of variation of the subject, reproducing and extending the scene film to a sufficient number of frames to afford a desired length of projection time, lap-dissolving between consecutive scenes on the reproduced and extended scene film, and combining the said number of frames with a traveling matte and with a moving element film to simulate the original changing appearance of the subject.

11. In the production of a cinema film depicting the changing appearance of a subject, the steps of preparing a scene film by exposing a frame for a cycle during which the appearance of the subject varies, reproducing and extending the scene film to a sufficient number of frames to afford a desired length of projection time, and combining the said number of frames with a moving element film to simulate the original changing appearance of the subject.

12. In the production of a cinema film depicting the cyclically changing appearance of a subject, the steps of preparing a scene film by exposing a frame for an integral number of complete cycles of variation of the subject, reproducing and extending the scene film to a sufficient number of frames to afford a desired length of projection time, and combining the said number of frames with a moving element film to simulate the original changing appearance of the subject.

13. In the production of a cinema film depicting the substantially cyclically changing appearance of a subject, the steps of preparing a scene film by exposing a frame for an integral number of complete virtual cycles of variation of the subject, reproducing and extending the scene film to a sufficient number of frames to afford a desired length of projection time, and combining the said number of frames with a moving element film to simulate the original changing appearance of the subject.

14. In the production of a cinema film depicting the changing appearance of a subject, the steps of preparing a scene film by exposing each frame for a cycle during which the appearance of the subject varies, reproducing and extending the scene film to a sufficient number of frames to afford a desired length of projection time, lap-dissolving between consecutive cycles on the reproduced and extended scene film, and combining the said number of frames with a moving element film to simulate the original changing appearance of the subject.

15. In the production of a cinema film depicting the substantially cyclically changing appearance of a subject, the steps of preparing a scene film by exposing each frame for an integral number of complete virtual cycles of variation of the subject, reproducing and extending the scene film to a sufficient number of frames to afford a desired length of projection time, lap-dissolving between consecutive scenes on the reproduced and extended scene film, and combining the said number of frames with a moving element film to simulate the original changing appearance of the subject.

16. In the production of a cinema film depicting the substantially cyclically changing appearance of an oscilloscope screen, the steps of preparing a scene film by exposing each frame to at least one substantially complete virtual cycle of said changing appearance, reproducing and extending said scene film to a sufficient number of frames to afford a desired length of projection time, lap-dissolving between consecutive scenes on the reproduced and extended scene film, and combining the said number of frames with a traveling matte (comprising a polar gray scale) and with a moving element film that simulates a sweeping radius of an oscilloscope presentation, whereby to simulate the original changing appearance of said oscilloscope screen.

JOHN V. WALLER.

REFERENCES CITED

The following references are of record in the file of this patent:

UNITED STATES PATENTS

| Number | Name | Date |
| --- | --- | --- |
| 1,397,600 | Owen | Nov. 22, 1921 |
| 1,416,154 | Ahbe | May 16, 1922 |
| 1,715,127 | Goldman | May 28, 1929 |
| 2,244,688 | Goldsmith et al. | June 10, 1941 |
| 2,323,534 | Goddard | July 6, 1943 |
| 2,353,154 | Fowler | July 11, 1944 |
| 2,357,624 | Amdur | Sept. 5, 1944 |

FOREIGN PATENTS

| Number | Country | Date |
| --- | --- | --- |
| 134,357 | Great Britain | Nov. 6, 1919 |